(12) United States Patent
Han et al.

(10) Patent No.: US 9,675,949 B2
(45) Date of Patent: Jun. 13, 2017

(54) QUANTITATIVE CATALYST SUPPLY DEVICE

(71) Applicant: HEESUNG CATALYSTS CORPORATION, Gyeonggi-do (KR)

(72) Inventors: Sang-Yun Han, Gyeonggi-do (KR); Seung Chul Na, Gyeonggi-do (KR); Hyun-sik Han, Seoul (KR)

(73) Assignee: HEESUNG CATALYSTS CORPORATION, Gyeonggi-do (KR)

( * ) Notice: Subject to any disclaimer, the term of this patent is extended or adjusted under 35 U.S.C. 154(b) by 29 days.

(21) Appl. No.: 14/888,196

(22) PCT Filed: Apr. 30, 2014

(86) PCT No.: PCT/KR2014/003824
§ 371 (c)(1),
(2) Date: Oct. 30, 2015

(87) PCT Pub. No.: WO2014/178634
PCT Pub. Date: Nov. 6, 2014

(65) Prior Publication Data
US 2016/0074822 A1    Mar. 17, 2016

(30) Foreign Application Priority Data
May 2, 2013 (KR) ........................ 10-2013-0049194

(51) Int. Cl.
*B05C 3/02* (2006.01)
*B01J 8/00* (2006.01)
(Continued)

(52) U.S. Cl.
CPC .................. *B01J 8/002* (2013.01); *B01J 4/02* (2013.01); *B01J 8/0015* (2013.01); *B01J 8/0025* (2013.01);
(Continued)

(58) Field of Classification Search
None
See application file for complete search history.

(56) References Cited

U.S. PATENT DOCUMENTS 4,609,563 A * 9/1986 Shimrock ............ B01J 37/0215
118/50
5,094,278 A * 3/1992 Arao ........................ B67C 3/28
239/590.3
(Continued)

FOREIGN PATENT DOCUMENTS

JP   2002-122075 A    4/2002
JP   2005-186276 A    7/2005
(Continued)

OTHER PUBLICATIONS

International Search Report, mailed Jul. 1, 2014 by the Korean Searching Authority.

*Primary Examiner* — Binu Thomas
(74) *Attorney, Agent, or Firm* — Meunier Carlin & Curfman LLC (57) ABSTRACT

The present invention provides a quantitative catalyst supply device that supplies a predetermined amount of catalyst slurry through an injection port formed through a container bottom. The quantitative catalyst supply device includes: an extendible supply pipe connected to a hopper and filled with catalyst slurry; a head connected to the supply pipe and supplying catalyst slurry to the injection port at the container bottom; a cylinder connected to a side of the supply pipe and supplying a predetermined amount of catalyst slurry through the head; and valve units disposed in an upper portion and a lower portion of the supply pipe spaced from the cylinder and opened or closed by operation of the cylinder.

2 Claims, 6 Drawing Sheets (51) Int. Cl.
   *B05C 7/02*    (2006.01)
   *B01J 4/02*    (2006.01)
   *B01J 19/24*   (2006.01)
   *B01J 37/02*       (2006.01)
   *B05C 7/08*        (2006.01)
   *F16K 23/00*       (2006.01)

(52) U.S. Cl.
   CPC ......... *B01J 8/0035* (2013.01); *B01J 19/2485* (2013.01); *B05C 3/02* (2013.01); *B05C 7/02* (2013.01); *B01J 37/0215* (2013.01); *B01J 2208/00008* (2013.01); *B01J 2208/00787* (2013.01); *B05C 7/08* (2013.01); *F16K 23/00* (2013.01)

(56) References Cited

U.S. PATENT DOCUMENTS

| | | | | |
|---|---|---|---|---|
| 5,165,970 | A * | 11/1992 | Schmidt | B01J 37/02 427/235 |
| 8,794,178 | B2 * | 8/2014 | Mergner | B01J 37/0246 118/408 |
| 2006/0237563 | A1 * | 10/2006 | Hupp | F16K 23/00 239/556 |
| 2010/0163775 | A1 * | 7/2010 | Kim | F16K 15/183 251/357 |
| 2014/0363578 | A1 * | 12/2014 | Han | C10G 1/10 118/50 |

FOREIGN PATENT DOCUMENTS

KR  10-0703762 B1  4/2007
KR  10-2013-0034688 A  4/2013

* cited by examiner

QUANTITATIVE CATALYST SUPPLY DEVICE

TECHNICAL FIELD

The present invention relates to a quantitative catalyst supply device. More particularly, the present invention relates to a quantitative catalyst supply device that quantitatively supplies catalyst slurry to be coated on a support having a plurality of channels such as a monolithic support used for catalyst converters.

BACKGROUND ART

A catalyst converter is a device that converts noxious components in exhaust gas into innoxious components, using catalyst action. Common catalyst converters have a monolithic support in which a plurality of longitudinal channels are coated with carrier catalyst (hereafter, "catalyst slurry) containing various catalyst components. The support is made of ceramic or other materials. Various methods of coating a monolithic support with catalyst slurry are known in the art.

Figure 1:
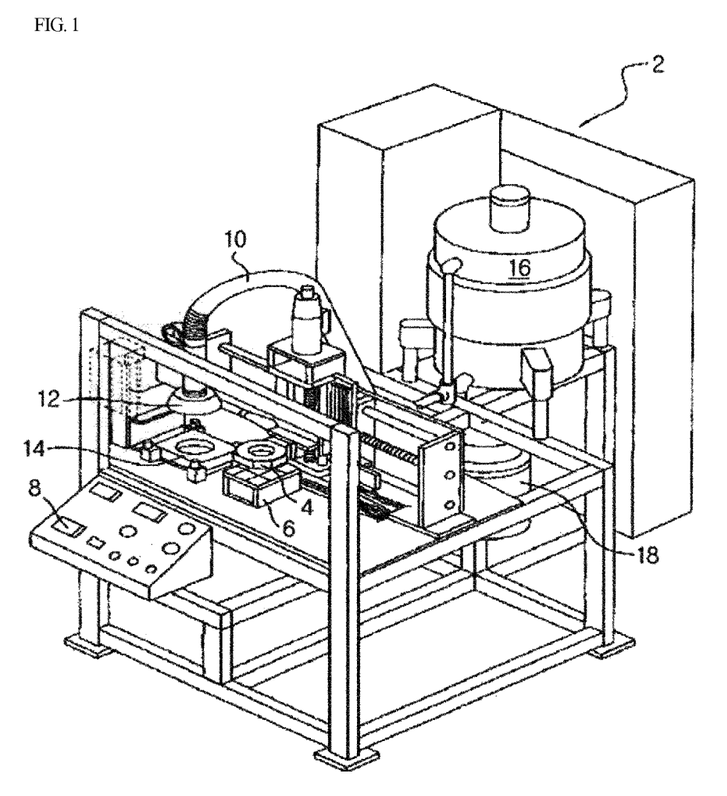
FIG. 1 is a schematic view of a monolithic support coating system of the related art.

FIG. 1 shows a monolithic support coating system 2 of the related art, in which a monolithic support (not shown) is usually loaded on a support clamp 4 on a lathe 6, and when a worker presses a start button 8, the support is put into a dip pan 14 keeping catalyst slurry supplied from a tank 16 so that the support is coated. When the support is brought in contact with the catalyst slurry, low-strength vacuum is made through a vacuum cone 12 connected to the support. The amount of the catalyst slurry in the dap pan 14 exceeds the amount of slurry for completing the coating, so slurry permeates into the support, but excessive slurry comes back out of the support.

However, the excessively supplied slurry is recirculated to be reused, so it causes various problems.

Accordingly, it is required to supply catalyst slurry in the exact amount for coating a support.

DISCLOSURE

Technical Problem

Accordingly, the present invention has been made keeping in mind the above problems occurring in the related art, and the present invention is intended to propose a quantitative catalyst supply device that quantitatively coats catalyst slurry on each channel of a monolithic support by quantitatively supplying catalyst slurry that is used for post-processing of exhaust gas.

The term "quantitative" used herein means the amount of catalyst slurry that is precisely controlled and almost completely coated on a plurality of channels. The term "almost complete coating" used herein means that only 1% or less of measured catalyst slurry is discharged without being coated on channels.

Technical Solution

In order to achieve the above object, according to one aspect of the present invention, there is provided a quantitative catalyst supply device that supplies a predetermined amount of catalyst slurry through an injection port formed through a container bottom. The device includes: an extendible supply pipe connected to a hopper and filled with catalyst slurry; a head connected to the supply pipe and supplying catalyst slurry to the injection port at the container bottom; a cylinder connected to a side of the supply pipe and supplying a predetermined amount of catalyst slurry through the head; and valve units disposed in an upper portion and a lower portion of the supply pipe spaced from the cylinder and opened or closed by operation of the cylinder.

The valve units may include: a first valve body and a second valve body disposed at the upper and lower portions in the supply pipe spaced from the cylinder and moved up and down in the supply pipe by the cylinder; a first inlet and a second inlet formed under the first and second valve bodies and opened and closed by the first and second valve bodies; and a first outlet and a second outlet formed over the first and second valve bodies, having a diameter larger than the diameters of the first and second valve bodies, and allowing catalyst slurry to flow when the cylinder is operated.

A hollow external pipe may be coupled to a lower portion of the injection port at the container bottom, the head may be disposed in the external pipe, a support plate for supporting the head may be formed in the external pipe, and the head may be sealed by sealing members between the external pipe and the support plate.

The head may have: a wide portion sealed with respect to the external pipe by a sealing member; an inclined portion extending upward and inclined inward from the wide portion; and a narrow portion vertically protruding upward from the inclined portion and sealed with respect to the injection port at the container bottom by a sealing member; the intake port at the container bottom may have: an inclined surface brought in surface contact with the inclined portion of the head; and a vertical surface extending upward from the inclined surface and brought in surface contact with the narrow portion of the head; and the head may seal the container by moving upward in the external pipe and by being fitted into the injection port at the container bottom.

Advantageous Effects

According to the quantitative catalyst supply device, it is possible to solve all of the problems that may be generated by excessive slurry or remaining slurry in coating in the related art by quantitatively supplying catalyst slurry into a variable container provided for supplying catalyst slurry to a monolithic support.

BEST MODE

Hereinafter, exemplary embodiments of the present invention will be described in detail with reference to the accompanying drawings.

FIGS. 2 to 6 are views showing a quantitative catalyst supply device according to the present invention.

A quantitative catalyst supply device 100 of the present invention, as shown in the figures, supplies quantitative catalyst slurry S into a variable container through an injection port 161 formed through the container bottom 160 of the variable container 200.

The variable container 200, simply, can change in volume and the container bottom 160 of the container is movable. That is, the container bottom 160 may be connected and moved with a lifting unit (not shown), when it is moved up, the volume of the container decreases, and when it is moved down, the volume of the container can be returned.

The container bottom 160 can slide on walls in close contact with them and the gaps between the walls and the container bottom 160 can be closed by a sealer. The sliding in close contact means that the container bottom 160 can move on the container walls without slurry that has been supplied in the container leaking through gaps that may exist between the container bottom 160 and the walls.

The container bottom 160 may be maintained horizontally by a specific unit, for example, a horizontal sensor, the container may be made of various materials, and the materials of the walls and the bottom may be the same or not.

An external pipe 150 that is sealed is coupled to the lower portion of the injection port 161 at the container bottom 160 and it will be described in detail below.

Figure 2:
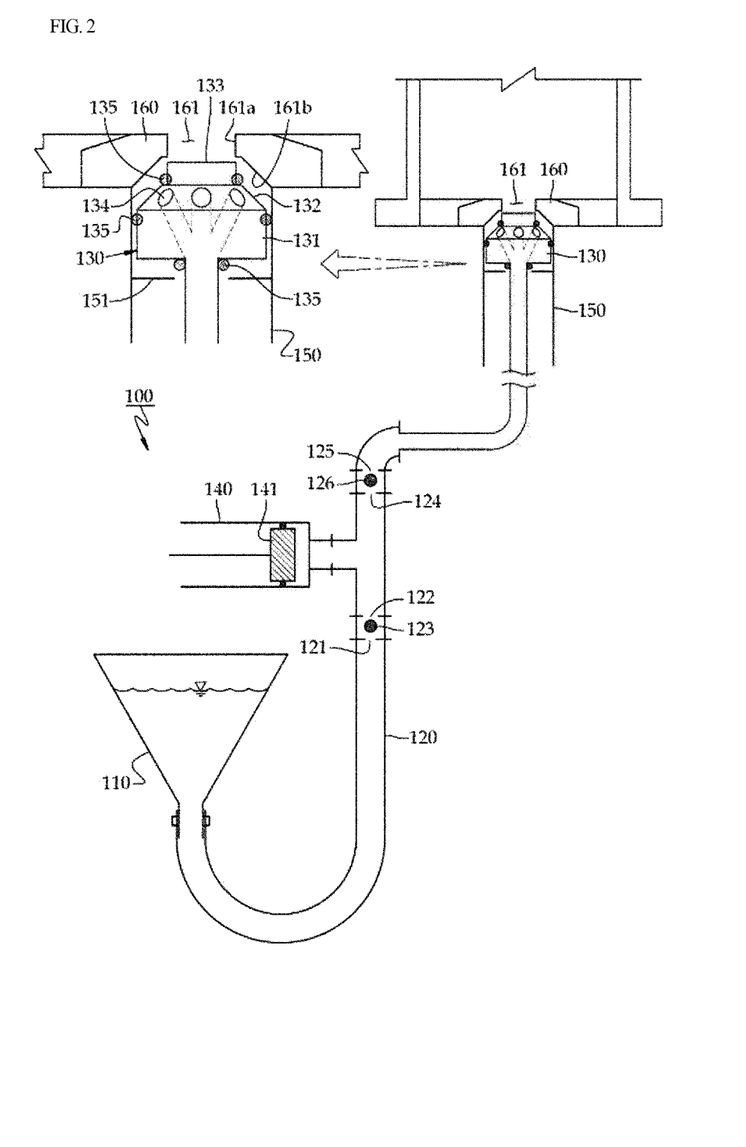
FIG. 2 is a view showing the configuration of a quantitative catalyst supply device according to the present invention.

The quantitative catalyst supply device 100, as shown in FIG. 2, includes: a supply pipe 120 having a first end connected to a hopper 110 and filled with catalyst slurry S; a head connected to a second end of the supply pipe 120 and supplying catalyst slurry S to the injection port 161 at the container bottom 160; a cylinder 140 connected to a side of the supply pipe 120 and supplying catalyst slurry in quantitative amount through the head 130; and valve units disposed in upper and lower portions of the supply pipe 120 spaced from the cylinder 140 and selectively opening/closing the upper and lower portions of the supply pipe 120 when the cylinder 140 is operated.

The hopper 110 keeps catalyst slurry S and the supply pipe 120 connected with the hopper 110 is filled with catalyst slurry S supplied from the hopper 110 at a predetermined level. The catalyst slurry S in the supply pipe 120 may be kept at a predetermined level submerging not only the cylinder 140, but also the valve units.

The supply pipe 120 may be a corrugated pipe that can freely extend/contract and the entire or a portion of the supply pipe 120 may be corrugated.

The valve units include: first and second valve bodies 123 and 126 disposed at the upper and lower portions in the supply pipe 120 spaced from the cylinder and moved up/down in the supply pipe 120 by the cylinder 140; first and second inlets 121 and 124 formed under the first and second valve bodies 123 and 125 and opened/closed by the first and second valve bodies 123 and 126; and first and second outlets 122 and 125 formed over the first and second valve bodies 123 and 126, having a diameter larger than those of the first and second valve bodies 123 and 126, and allowing catalyst slurry S to flow when the cylinder 140 is operated.

The first and second valve bodies 123 and 126 are spherical bodies having specific gravity that can be lifted by intake or discharge pressure of the cylinder 140.

The first and second inlets 121 and 124 block the supply pipe 120 and have a diameter smaller than those of the first and second valve bodies 123 and 126 to be opened/closed by the first and second valve bodies 123 and 126.

The first and second outlets 122 and 125 block the supply pipe 120, similar to the first and second inlets 121 and 124, but they have a diameter larger than those of the first and second valve bodies 123 and 126, so they are always open regardless of the first and second valve bodies 123 and 126.

The cylinder 140 communicates with the supply pipe 120 at an end and a piston 141 is disposed in the cylinder 140 and hermetically moves therein.

Accordingly, when the piston 141 is moved backward in FIG. 2, intake pressure is generated in the cylinder 140, so the catalyst slurry S in the supply pipe 120 is sucked, but when the piston 141 is moved forward, discharge pressure is generated in the cylinder 140, so the catalyst slurry S in the cylinder 140 is discharged to the supply pipe 120.

The head 130 is disposed inside the external pipe 150 and has a shape corresponding to the injection port 161 of the container bottom 160. That is, the head 130 has a wide portion 131 sealed with respect to the inner side of the external pipe 150 by a sealing member 135, an inclined portion 132 extending upward and inclined inward from the wide portion 131, and a narrow portion 133 vertically protruding upward from inclined portion 132 and sealed with respect to the injection port 161 of the container bottom 160 by a sealing member 135.

The catalyst slurry S supplied from the head 130 is supplied into the variable container 200 through the injection port 161 at the container bottom 160, and then as the head 130 is moved up by the lifting unit (not shown), all of the catalyst slurry S between the head 130 and the external pipe 150 is supplied into the variable container 200 through the injection port 161 at the container bottom 160.

The injection port 161 at the container bottom 160 has an inclined surface 161b at the lower end which corresponds to the inclined portion 132 of the head 10 and has a vertical surface 161 over the inclined surface 161b which corresponds to the narrow portion 133 of the head 130, so when the head 130 is fitted into the injection port 161 at the container bottom 160, the narrow portion 133 and the inclined portion 132 of the head 130 are brought in close contact with the vertical surface 161a and the inclined surface 161b of the injection port 161, so all of the catalyst slurry S between the head 130 and the external pipe 150 can be supplied into the variable container 200.

The sealing member 135 may be disposed at the lower end of the narrow portion 133 and the upper end of the wide portion 131, but it is not limited thereto.

The external pipe 150, a hollow pipe, is disposed outside the head 130. The external pipe 150 is sealed and coupled to the lower end of the injection port 161 at the container bottom 160 and a ring-shaped support plate 151 is formed in the external pipe 150 and supports the bottom of the head 130. Obviously, the supply pipe 120 connected with the head 130 passes through the center of the support plate 151 and a sealing member 135 is disposed at the joint of the supply pipe 120 and the head 130 (that is, on the bottom of the head 130), thereby sealing the gap between the head 130 and the support plate 151.

The external pipe 150 is connected to a moving unit (not shown) for moving up/down the container bottom 160, and when the moving unit is operated, the lifting unit (not shown) for moving up/down the head 130 may be operated. The sealing member 135 stated herein may be an O-ring.

Operation of the quantitative catalyst supply device of the present invention is described hereafter.

Figure 3:
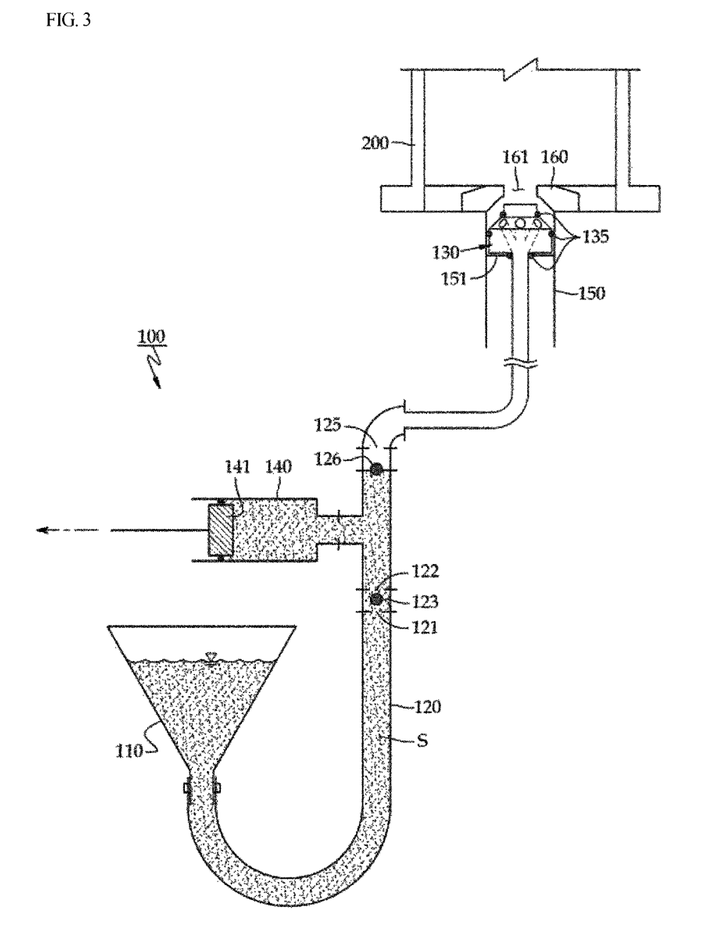
FIGS. 3 to 6 are views illustrating operation of the quantitative catalyst supply device according to the present invention.

First, as in FIG. 3, when the piston 141 in the cylinder 140 of the quantitative catalyst supply device 100 is pulled backward, some of the catalyst slurry S in the supply pipe 120 is sucked into the cylinder 140 by intake force generated in the cylinder 140, in which the first valve body 123 at the lower position moved up and opens the first inlet 121 and the second valve body 126 at the upper position is moved down and closes the second inlet 124.

Accordingly, due to the opening/closing by the first and second valve bodies 123 and 126, the amount of catalyst slurry S in the hopper 110 is sucked into the supply pipe 120 equal to the amount of catalyst slurry S sucked into the cylinder 140.

Here, the amount of the catalyst slurry S sucked into the cylinder 140, which is the amount for one-time coating, may be determined on the basis of the movement distance of the piston 141 through tests.

Thereafter, the piston 141 is stopped, so that the first valve body 123 drops and closes the first inlet 121, thereby preventing flow of the catalyst slurry S.

Figure 4:
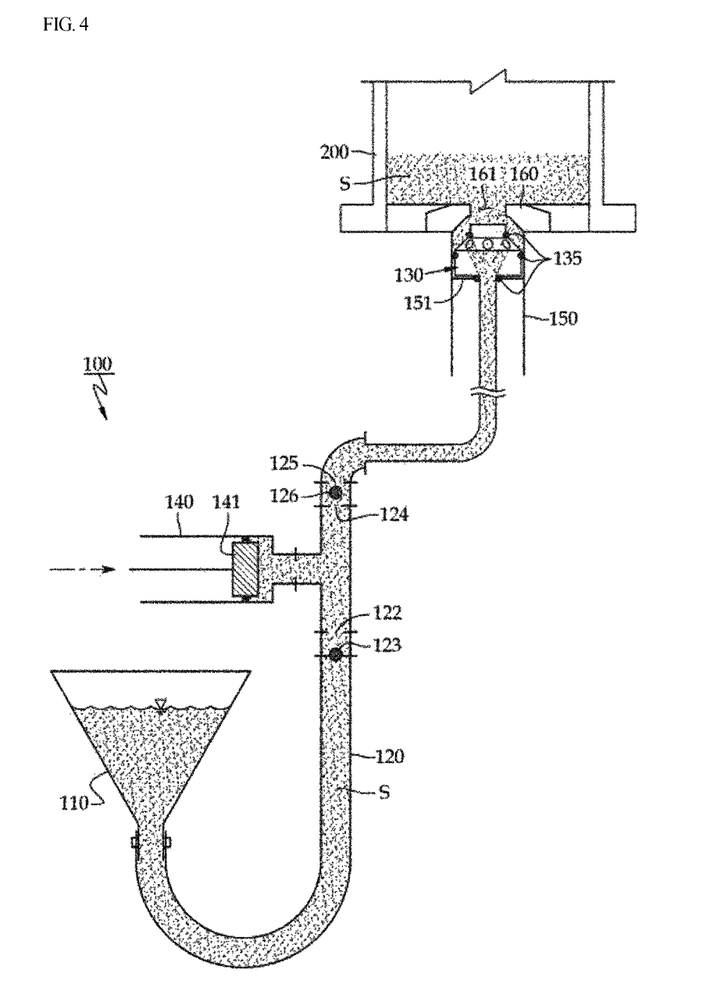

Further, as in FIG. 4, when the piston 141 is moved forward, the catalyst slurry S in the cylinder 140 is discharged to the supply pipe 120 by discharge pressure generated in the cylinder 140, in which the first valve body 123 at the lower position closes the first inlet 121 and the second valve body 126 opens the moved up and opens the lower second inlet 124.

Accordingly, the catalyst slurry S in the supply pipe 120 is supplied to the head 130 through the second inlet 124 and the second outlet 125, and the supplied catalyst slurry S is discharged from the head 130 through a supply hole 134 of the head 130 and then supplied into the variable container 200 through the injection port 161 at the container bottom 160.

The amount of the catalyst slurry S discharged from the head 130 is the same as the amount of the catalyst slurry S that has been sucked in the cylinder 140 and is the amount for one-time coating.

However, the catalyst slurry S discharged from the head 130, as in FIG. 4, is not all supplied into the variable container 200 and some of the catalyst slurry S remains between the head 130 and the external pipe 150, so a predetermined amount of catalyst slurry S has not been supplied yet in the variable container 200.

Figure 5:
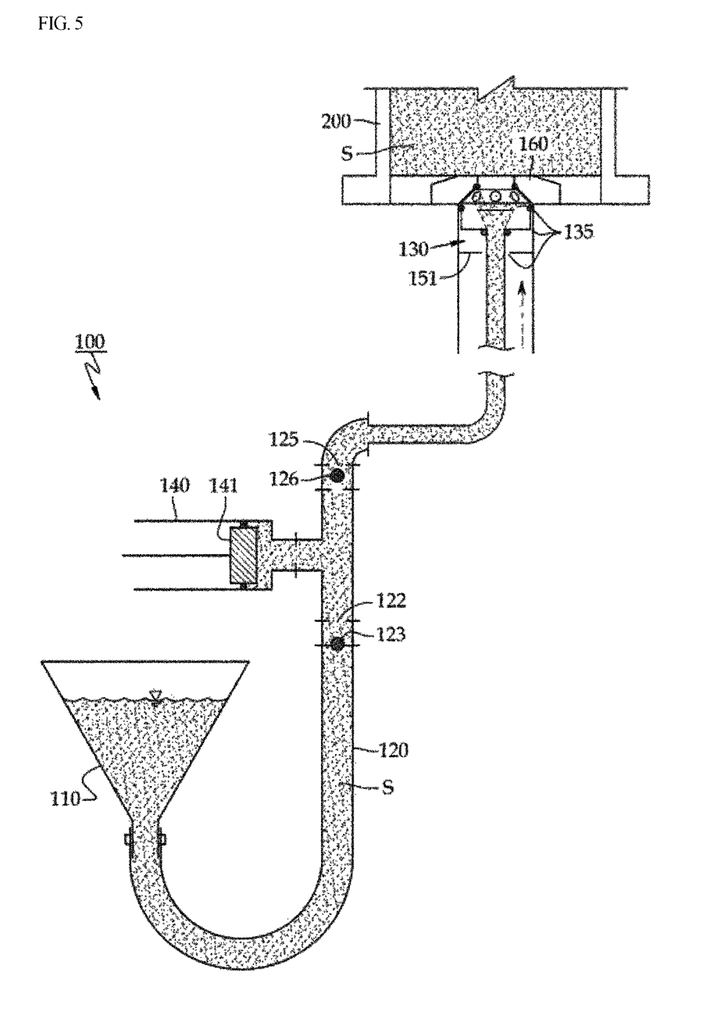

Thereafter, when the piston 141 finished moving forward, as in FIG. 5, the head 130 is moved upward in the external pipe 140 by the lifting unit (not shown), with the second valve body 126 keeping the second inlet 124 open with the sealing between the head 130 and the external pipe 150 maintained, in which the head 130 keeps moving until it is inserted in the injection port 161 at the container bottom 160.

Since the head 130 and the injection port 161 are formed in shapes corresponding to each other, they are accurately fitted in close contact with each other and the sealing is kept by the sealing members 135 on the head 130, so the catalyst slurry S between the head 130 and the external pipe 150 is entirely supplied into the variable container 200 through the injection port 161 at the container bottom 160, and accordingly, a predetermined amount of catalyst slurry S can be supplied into the variable container 200.

Figure 6:
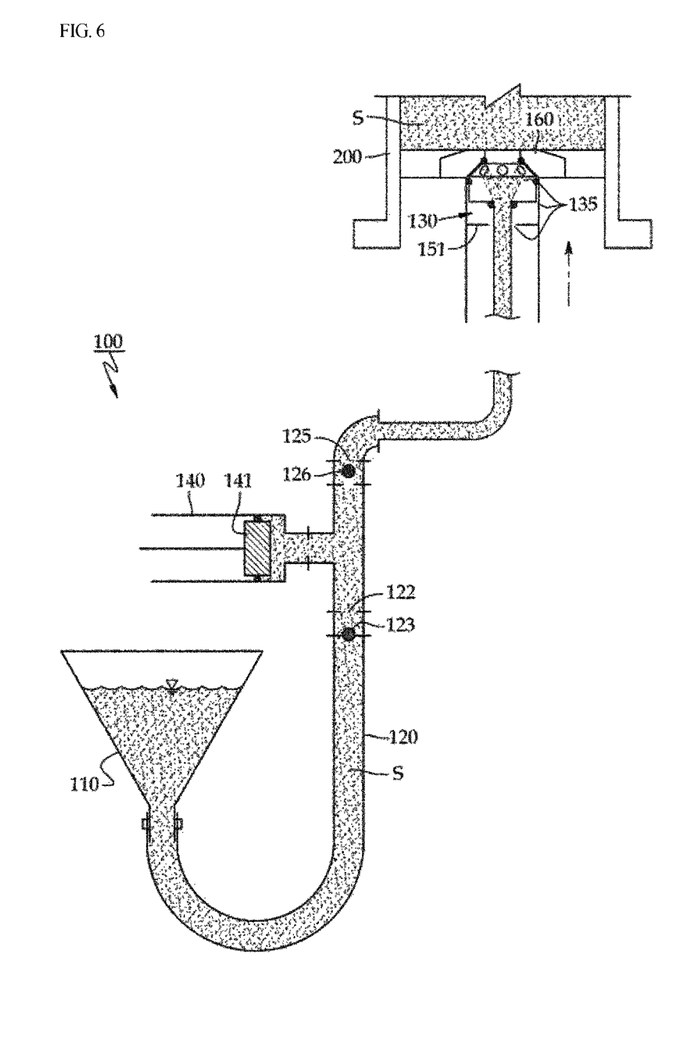

Thereafter, as in FIG. 6, the container bottom 600 is moved up by the moving unit (not shown) and injects the catalyst slurry S in the variable container S into a catalyst support (not shown), in which the head 130 is also moved upward by the lifting unit (not shown), similar to the container bottom 160, while keeping the injection port 161 at the container bottom 160 closed, so a predetermined amount of catalyst slurry S can be injected without leaking.

The invention claimed is:

1. A quantitative catalyst supply device that supplies a predetermined amount of catalyst slurry through an injection port formed through a container bottom, the device comprising:
   an extendible supply pipe connected to a hopper and filled with catalyst slurry;
   a head connected to the supply pipe and supplying catalyst slurry to the injection port at the container bottom;
   a cylinder connected to a side of the supply pipe and supplying a predetermined amount of catalyst slurry through the head; and
   valve units disposed in an upper portion and a lower portion of the supply pipe spaced from the cylinder and opened or closed by operation of the cylinder,
   wherein a hollow external pipe is coupled to a lower portion of the injection port at the container bottom, the head is disposed in the hollow external pipe, a support plate for supporting the head is formed in the hollow external pipe, and the head is sealed by sealing members between the hollow external pipe and the support plate,
   wherein the head has:
      a wide portion sealed with respect to the external pipe by a sealing member;
      an inclined portion extending upward and inclined inward from the wide portion; and
      a narrow portion vertically protruding upward from the inclined portion and sealed with respect to the injection port at the container bottom by a sealing member,
   wherein the injection port at the container bottom has:
      an inclined surface brought in surface contact with the inclined portion of the head; and
      a vertical surface extending upward from the inclined surface and brought in surface contact with the narrow portion of the head, and
   wherein the head seals the container by moving upward in the external pipe and by being fitted into the injection port at the container bottom.

2. The device of claim 1, wherein the valve units include: a first valve body and a second valve body disposed at the upper and lower portions in the supply pipe spaced from the cylinder and moved up and down in the supply pipe by the cylinder; a first inlet and a second inlet formed under the first and second valve bodies and opened and closed by the first and second valve bodies; and
   a first outlet and a second outlet formed over the first and second valve bodies, having a diameter larger than the diameters of the first and second valve bodies, and allowing catalyst slurry to flow when the cylinder is operated.

\* \* \* \* \*